(12) United States Patent
Donovan et al.

(10) Patent No.: US 6,467,437 B2
(45) Date of Patent: Oct. 22, 2002

(54) DOG TRAINING LEAD

(75) Inventors: Brian H. Donovan, Livonia, MI (US); Kenneth J. Besancon, Uniontown, OH (US); Jay Kendall Crouso, West Lafayette, OH (US)

(73) Assignee: Orrco Incorporated, Orrville, OH (US)

( * ) Notice: Subject to any disclaimer, the term of this patent is extended or adjusted under 35 U.S.C. 154(b) by 0 days.

(21) Appl. No.: 09/813,709

(22) Filed: Mar. 21, 2001

(65) Prior Publication Data

US 2002/0005175 A1 Jan. 17, 2002

Related U.S. Application Data

(60) Provisional application No. 60/191,136, filed on Mar. 22, 2000.

(51) Int. Cl.[7] .............................................. A01K 27/00
(52) U.S. Cl. ...................... 119/798; 119/719; 119/795
(58) Field of Search ............................... 119/719, 769, 119/770, 792, 793, 795–798; D30/153; 446/415

(56) References Cited

U.S. PATENT DOCUMENTS

| | | | |
|---|---|---|---|
| 729,912 A | 6/1903 | Andrews | |
| 986,973 A | 3/1911 | Gordon | |
| 1,509,956 A | * 9/1924 | Kipp | ........................ 446/418 |
| 2,275,701 A | 3/1942 | Taylor | |
| 3,072,097 A | 1/1963 | Morchand | |
| 4,488,511 A | 12/1984 | Grassano | |
| 4,993,366 A | 2/1991 | Sager | |
| 5,107,793 A | 4/1992 | Tymkewicz | |
| 5,146,876 A | 9/1992 | McPhail | |
| 5,351,654 A | 10/1994 | Fuentes | |
| 5,494,002 A | 2/1996 | Greene | |
| 5,497,733 A | * 3/1996 | Hull et al. | ................... 119/793 |
| D388,558 S | 12/1997 | Miller | |
| 5,706,764 A | 1/1998 | Irbinskas | |
| 5,732,662 A | * 3/1998 | Jacobsen | .................... 119/798 |
| 5,762,028 A | 6/1998 | Owings | |
| 5,830,037 A | * 11/1998 | Mastandrea, Jr. | ........... 446/415 |
| 5,873,328 A | 2/1999 | Campbell | |
| D408,103 S | 4/1999 | Snedeker | |
| 5,915,336 A | * 6/1999 | Watson | ........................ 119/797 |
| 6,085,500 A | * 6/2000 | Keppick | ........................ 54/71 |
| 6,125,793 A | * 10/2000 | Petty | ........................... 119/856 |

* cited by examiner

*Primary Examiner*—Charles T. Jordan
*Assistant Examiner*—Tara M Golba
(74) *Attorney, Agent, or Firm*—Fay, Sharpe, Fagan, Minnich & McKee, LLP

(57) ABSTRACT

A dog training lead includes first and second sound-producing strips or members. An elastic member is interposed between the first and second strips, and is connected at the opposite ends thereof to and in a coaxial manner with the lead. The elastic member is dimensioned to bias the terminal ends of the first and second strips toward each other to thereby place the central portions of the first and second strips in a first or laterally spaced-apart relationship relative to each other. Upon application of a sharp, corrective pull on the lead by a trainer, the elastic member elongates toward a second position, and this results in the central portions of the first and second strips contacting each other with sufficient speed and force to emit a sharp "snap" sound.

14 Claims, 3 Drawing Sheets

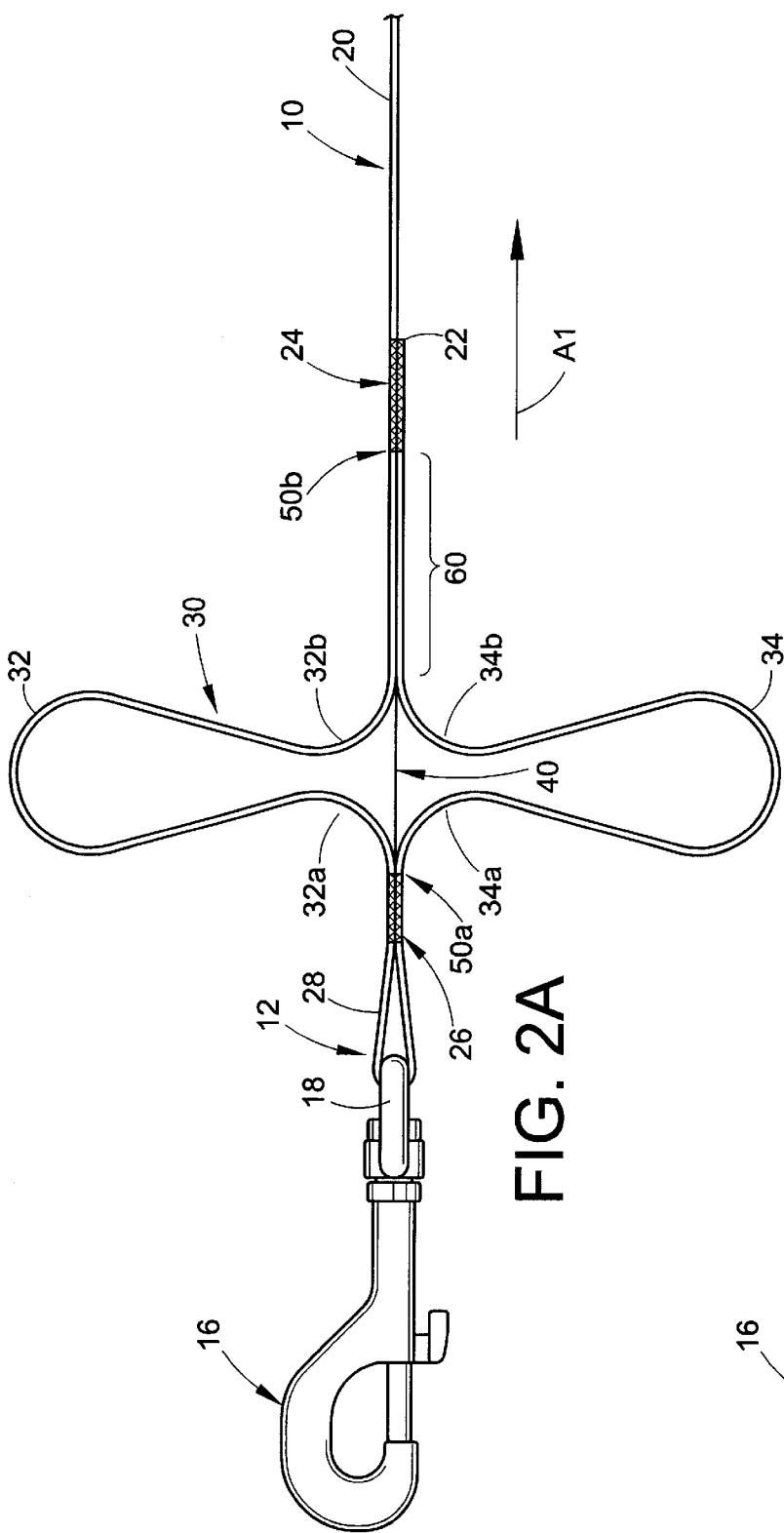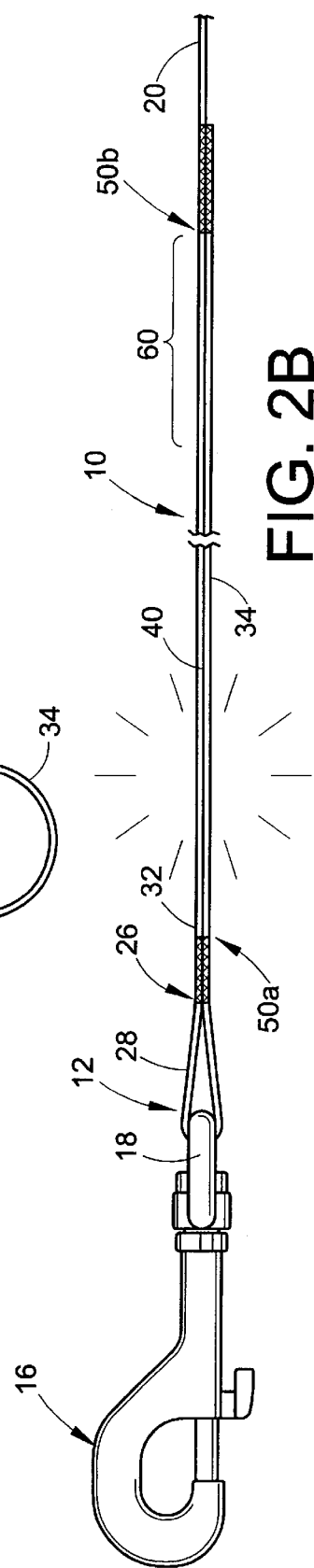
FIG. 2A
FIG. 2B

DOG TRAINING LEAD

CROSS-REFERENCE TO RELATED APPLICATION

The present application claims priority from and hereby expressly incorporates by reference U.S. provisional application Ser. No. 60/191,136 filed Mar. 22, 2000.

BACKGROUND OF THE INVENTION

The present invention relates generally to the art of pet products. More particularly, the invention is directed to a dog training lead that is particularly adapted for delivering an audible corrective response to a dog secured to a distal end of the training lead. The invention will be described as a dog training lead, but those of ordinary skill in the art will recognize that the lead has wider application such as, for example, training other types of animals including horses or the like.

Heretofore, dogs have typically been trained using leads designed simply to act as a tether. These prior leads, which vary in length, are used to prevent the dog from wandering and to deliver a corrective tug or pull to the dog when the dog exhibits objectionable behavior. Most commonly, such leads have been constructed from an elongated strip or web of nylon, leather, or other substantially inelastic material.

Often, a choke collar has been used together with a conventional tether-type training lead to encourage a dog to respond to corrective tugs on the lead. Choke collars are well known and are defined by a length of chain or other material terminated at its opposite ends by slip rings. A noose-type loop is formed from the length of chain so that corrective pulls on the lead and/or resistive action by the dog cause the choke collar to tighten around the dog's neck. While choke collars can be effective, some view them as inhuman. Further, a fairly large corrective tug must be exerted on the lead by a trainer in order to cause meaningful action in the choke collar. Thus, inexperienced trainers may damage the dog's throat and/or neck.

As an advancement of the choke collar concept and its potential for injury to dogs through lack of knowledge or misuse, some prior dog training leads have incorporated an elastic element for purposes of reducing the severity or cushioning the pulling force delivered to the dog when it pulls abruptly on the lead and/or when the trainer delivers a corrective pull. U.S. Pat. No. 5,873,328 discloses one example of a dog training lead including an elastic element for preventing injury to the dog's neck when correctional tugs or jerks are applied by a trainer.

Other types of dog training leads have incorporated sound producing means for selectively delivering of an audible corrective response to the dog. U.S. Pat. No. 3,072,097 discloses one such dog training lead wherein a whistle is disposed at the distal end of the lead and connected by tubing to a bulb located at the proximal end. In use, the trainer squeezes the bulb to force air through the whistle so that it produces sound.

U.S. Pat. No. 5,494,002 discloses a more modern example of a sound-producing dog training lead. An electronic sound producing means is attached near the distal end of the lead. A spring-loaded activation button projects outwardly from the sound-producing means and is located between the housing of the sound producing means and the lead. When the lead is pulled with sufficient force, it thus exerts and maintains pressure on the activation button so that the sound-producing means operates to emit a corrective tone.

These prior devices have been found deficient in a variety of ways. Use of electronic sound producing means increases the cost and complexity of the lead, and the electronic device is subject to malfunction and damage, especially due to the sometimes harsh conditions (rain, snow, etc.) under which dog training leads are often used. Other prior training leads that are adapted to produce sound, such as that disclosed in the aforementioned U.S. Pat. No. 3,072,097, are somewhat inconvenient and ineffective given that the trainer must use two hands, i.e., one to maintain control of the dog and one to operate the sound producing means. This, then, can lengthen the time between the dog's objectionable behavior and the delivery of the audible corrective response.

Accordingly, it has been deemed desirable to develop a training lead that is operable by a trainer in a convenient, one-handed manner to deliver an audible corrective response, wherein no electronic or complex mechanical sound producing means are employed. It has further been considered desirable to develop such a lead wherein the action required by the trainer for activating the sound-producing means is intuitive and, thus, occurs contemporaneously with the dog's objectionable behavior.

SUMMARY OF THE INVENTION

In accordance with the present invention, a novel and non-obvious dog training lead is provided. The lead preferably comprises a conventional loop-type handle at its proximal end for grasping by a trainer, and a conventional clasp or other means for attachment to a collar or harness of a dog at its opposite, distal end. The handle and clasp are interconnected by a tether defined from an elongated flat strip or web of substantially inelastic material. The lead is fashioned to include a built-in sound producing means that, in response to a corrective pull on the lead by a trainer, emits a sharp "snap" sound that provides negative reinforcement to dog in addition to the corrective pull, itself.

The sound producing means comprises first and second sound-producing strips or members, and an elastic member. Preferably, the first and second sound-producing members are defined by first and second loop sections of the elongated tether. These first and second sections are preferably equal in length, disposed in opposed relation to each other, and connected only at their opposite terminal ends so that a space is defined laterally therebetween. An elastic member is interposed between the first and second strips, and is connected at the opposite ends thereof to and in a coaxial manner with the tether. The elastic member is dimensioned to bias the terminal ends of the first and second strips toward each other to thereby place the central portions of the first and second strips in a first or laterally spaced-apart relationship relative to each other. Upon application of a sharp, corrective pull on the lead by a trainer, the elastic member elongates toward a second position, and this results in the central portions of the first and second strips contacting each other with sufficient speed and force to emit a sharp "snap" sound. This noise acts as a negative reinforcement to the dog for training purposes. Upon relaxation of the lead, the elastic member shortens toward its first position and once again places the central portions of the first and second strips in laterally spaced relation.

One advantage of the present invention is found in the provision of a new and improved dog training lead that is adapted to deliver an audible corrective response to a dog in a convenient and effective manner without the potential for injury previously associated with conventional or choke collars.

Another advantage of the invention resides in the provision of a dog training lead that is adapted to deliver an audible corrective response to a dog without relying upon electronic and/or complex mechanical sound-producing means, and that does not require the trainer to use two hands.

A further advantage of the invention is found in the provision of a dog training lead adapted for producing an audible corrective response that is delivered simultaneously with the dog's misbehavior and with a traditional lead jerking corrective response.

A still further advantage of the invention resides in the provision of a dog training lead that is relatively simple and inexpensive to construct, that is easy and intuitive to use, and that is durable.

Yet a further advantage of the invention is found in the provision of a dog training lead that can be used, without modification, as a conventional dog handling lead.

Still other benefits and advantages of the present invention will become apparent to those of ordinary skill in the art to which the invention pertains upon their reading and comprehending the following specification together with the accompanying drawings.

BRIEF DESCRIPTION OF THE DRAWINGS

The invention comprises a variety of components and arrangements of components, a preferred embodiment of which are illustrated in the accompanying drawings that form a part hereof and wherein:

FIG. 2A is a partial illustration of a dog training lead formed in accordance with the present invention in its first operative or relaxed condition;

FIG. 2B is a view of the dog training lead of FIG. 2A after same has been extended into its second operative or elongated condition;

DETAILED DESCRIPTION OF PREFERRED EMBODIMENTS

Figure 1:
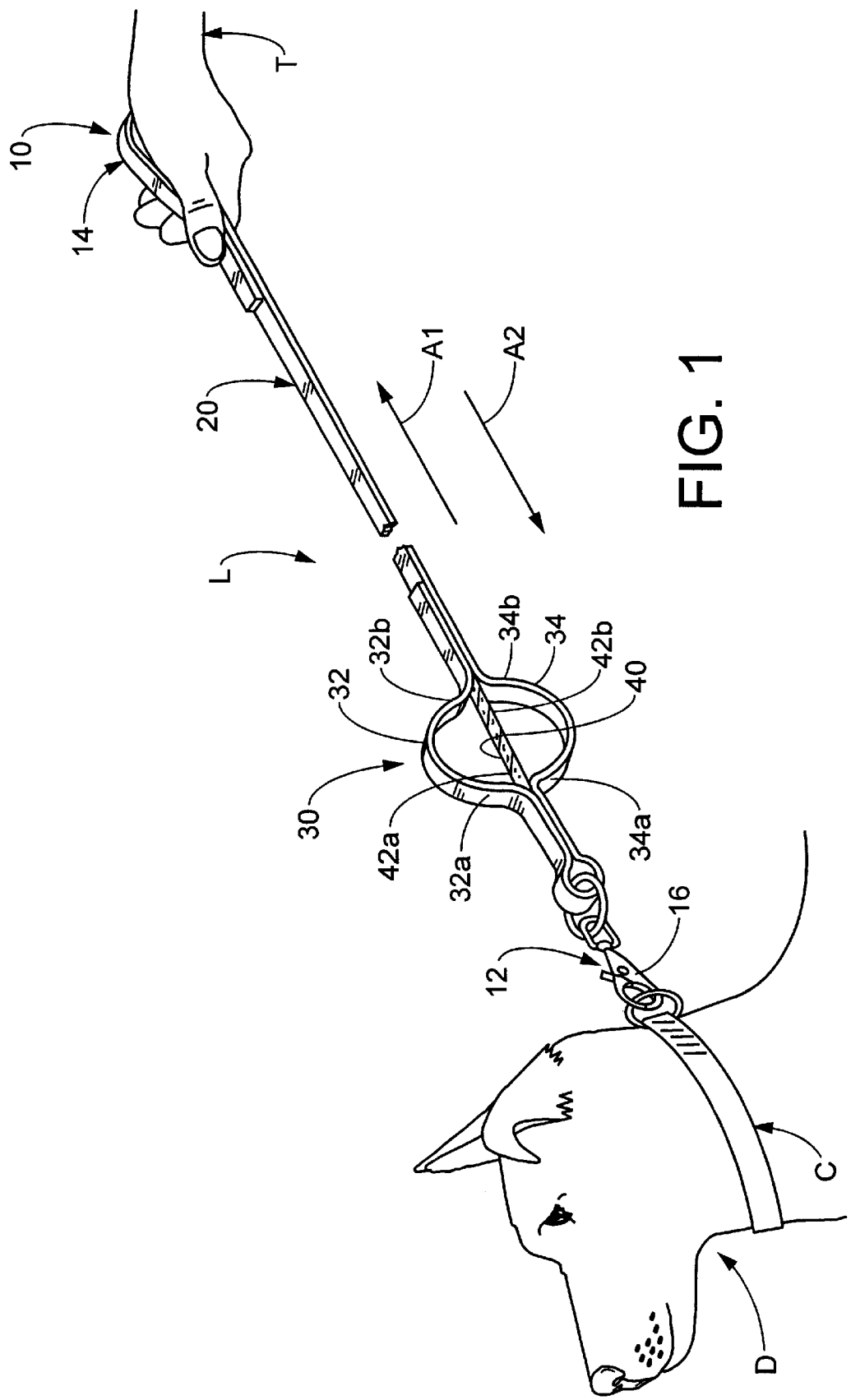
FIG. 1 is a perspective view of a dog training lead formed in accordance with the present invention as it may be used to train a dog.

Referring now to the drawings wherein the showings are for purposes of illustrating preferred embodiments of the invention only and not for purposes of limiting same, FIG. 1 shows a dog training lead L formed in accordance with the present invention as used by an associated human trainer T to train an associated dog D. The training lead L comprises a proximal or trainer end 10 and an opposite distal or dog end 12. The proximal end includes or defines a conventional lead grasping means such as a standard handle or loop 14, and the distal end includes a conventional dog attachment means such as a standard clasp 16 or the like.

A tether 20 is defined from an elongated narrow web or strip of substantially inelastic material, such as NYLON®, leather, or the like, and interconnects the opposite proximal and distal lead ends 10,12. The tether member is preferably defined from a flat strip of NYLON® webbing that is approximately 0.5–1.5 inches wide and, most preferably, approximately 1 inch wide.

Referring now to all of FIGS. 1, 2A and 2B, the lead includes an integral sound producing means 30. This sound producing means is comprised of first and second substantially inelastic strips 32,34 that are preferably identical or substantially similar to each other. Strips 32,34 are preferably defined as a one-piece construction from the elongated tether 20, itself. Each strip defines a first end portion 32a,34a and a second end portion 32b,34b. Like ends 32a,34a and 32b,34b are joined by stitching or other means so that the strips can define a space laterally therebetween that changes in dimension as a function of the distance between the opposed strip ends. More particularly, as the distance between the opposite ends 32a,34a and 32b,34b increases, the space between the first and second strips decreases.

The sound producing means further includes an elastic member 40 interposed in the space between first and second strips 32,34. The elastic member is connected in a coaxial manner with the tether 20 at ends 42a,42b. Moreover, the elastic member is dimensioned to bias the opposite terminal ends 32a,34a and 32b,34b of strips 32,34 toward each other to thereby place the central portions of the strips in their normal, laterally spaced-apart relationship to each other. Upon application of a sharp, corrective pull on the tether 20 by a trainer (indicated by the arrow A1 in FIGS. 1 and 2A) the elastic member 40 elongates, and this results in the central portions of the first and second strips contacting each other with sufficient speed and force so that a sharp "snap" sound is emitted (FIG. 2B). This noise acts as a negative reinforcement to the dog D for training purposes. Upon relaxation of the tether 20 (indicated by the arrow A2 in FIG. 1), the elastic member 40 shortens and once again places the central portions of the first and second strips 32,34 in their normal spaced relation relative to each other. The elastic member 40 is, itself, preferably a woven or non-woven web of fabric that includes elastically deformable fibers or other resilient elements. The use of a fabric-based elastic member, as opposed to a rubber band type member, facilitates construction by sewing.

With particular reference to FIGS. 2A and 2B, the preferred construction and operation of the subject training lead are illustrated. As noted, the first and second sound producing strips 32,34 are preferably defined as a one-piece construction with the tether 20. In the example shown in FIGS. 2A and 2B, the strip of material defining tether 20 is placed through a D-ring 18 or the like of the clasp 16 and doubled back upon itself. The free end 22 of the tether is secured by box stitching 24 or by otherwise convenient and effective means to a mid-span portion of the tether. Likewise, box stitching 26 or the like is used to form a loop 28 that receives the clasp D-ring 18.

The box stitching 24,26 serves the additional purpose of securing the opposite ends 42a,42b of the elastic member 40 to the tether. Thus, in the illustrated preferred embodiment, the first end 42a of the elastic member 40 is fixedly secured by the stitching at a first attachment point 50a (FIG. 2A), and the second end 42b (FIG. 3A) of the elastic member 40 is fixedly secured to the tether 20 by the stitching 24 at a second attachment point 50b. As already noted, the elastic member biases the connected strip ends 32a,34a and 32b, 34b toward each other as illustrated in FIG. 2A so that the first and second strips form respective loops and are laterally spaced apart relative to each other.

Figure 3A:
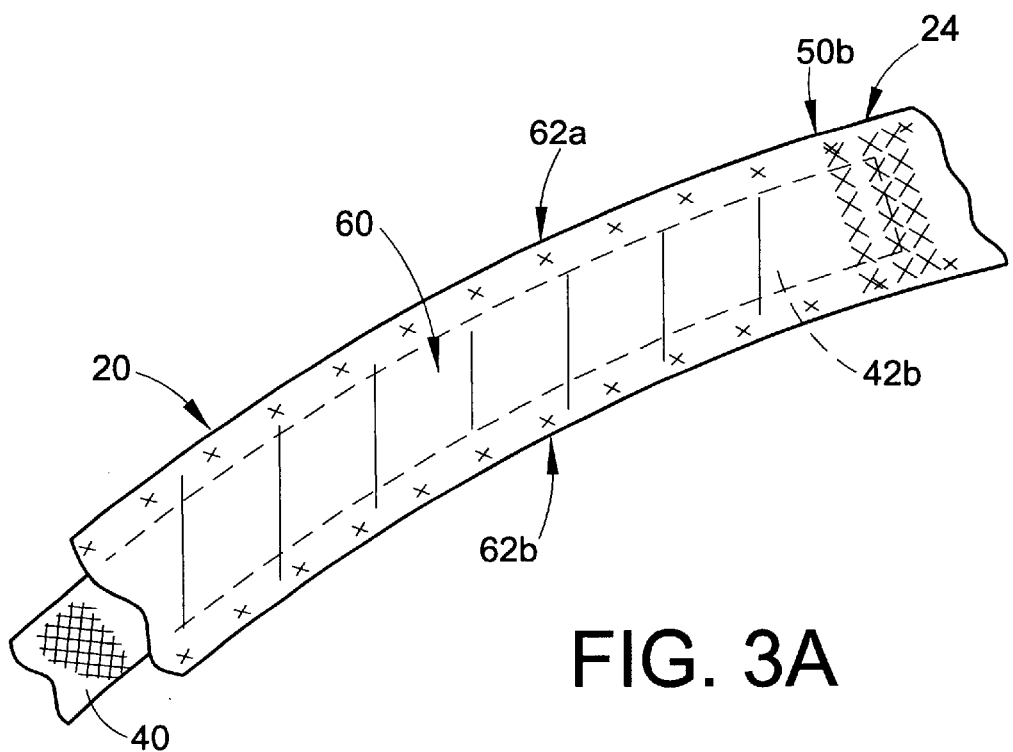
FIG. 3A is a partial perspective view illustrating a preferred twin-needle pocket arrangement for connecting one end of the elastic member to the inelastic lead member; and, FIG. 3B is a view similar to FIG. 3A for showing portions of the first and second sound-producing strips.
Figure 3B:
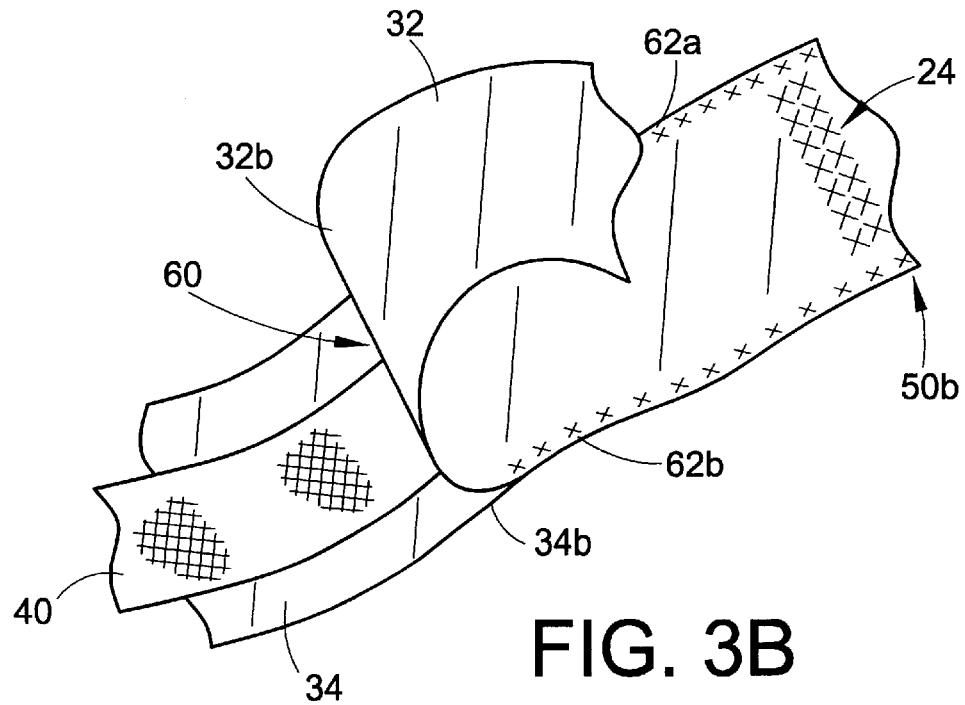

As best shown in FIGS. 3A and 3B, a twin-needle pocket 60 is formed in the tether by overlapping adjacent portions thereof. This pocket receives the portion of the elastic member that lies between second end 42b and the second ends 32b,34b of the first and second sound-producing strips. Those of ordinary skill in the art will recognize that such a pocket allows elastic member 40 to be lengthened without requiring any lengthening of first and second strips 32,34. The length of the elastic member is increased for ensuring that it is not at its elastic limit (as would prevent its further elongation) when the first and second strips 32,34 are brought sharply together by elongation of the tether.

Continuing with reference to FIGS. 3A and 3B, twin needle stitching 62a,62b is used to fixedly secure adjacent overlapping portions of the tether together along their opposite lateral edges. The space or pocket formed between the overlapping tether portions and stitching 62a,62b receives elastic member 40. As noted, the second terminal end 42b of the elastic member is secured at attachment point 50b in the pocket by the box stitching 24.

Referring again to FIGS. 2A and 2B operation of the dog training lead 10 is described in additional detail. When dog D retained by or connected at clasp 16 misbehaves or otherwise acts undesirably, a trainer pulls quickly and sharply on the tether in a direction away from the dog as indicated by the arrow A1 in FIG. 2A. As illustrated in FIG. 2B, the first and second sound-producing strips 32,34 are quickly tightened and brought into close contact with each other. In this process, the strips contact each other with sufficient speed and force so that a sharp "snap" sound is emitted. Once the trainer relaxes the tether 20, the lead 10 returns to the configuration illustrated in FIG. 2A.

In a preferred embodiment, the first and second strips 32,34 each have a length between their respective first and second opposite ends of approximately seven inches, and the twin needle pocket 60 has a length of approximately 3 to 3.5 inches. A preferred elastic member 40 has a length between attachment points 50a,50b of approximately 5.25 inches in its relaxed state, and extends to an approximate length of 10.25 inches when it is extended as illustrated in FIG. 2B. Of course, these elements can be otherwise dimensioned, and it is not intended that the invention be limited to any particular dimensions.

The invention has been described with reference to the preferred embodiment. Of course, modifications and alterations will occur to others upon a reading and comprehending the preceding specification. It is intended that the invention be construed as including all such modifications and alterations as encompassed by the following claims when properly construed literally and/or according to the doctrine of equivalents.

Having thus described the preferred embodiments, what is claimed is:

1. A dog training lead comprising:
    an elongated flexible lead member having axially spaced first and second opposite ends;
    first and second sound producing strips located between said first and second ends of said lead member, said first and second strips each including a first and a second end wherein said first ends of said strips are interconnected and said second ends of said strips are interconnected so that said first and second strips are located in opposed relation relative to each other and define a space therebetween; and,
    an elastic strip member having a first end connected to said flexible lead adjacent said first ends of said sound producing strips and a second end connected to said flexible lead adjacent said second ends of said sound producing strips, said elastic strip member extending through said space between said first and second strips and dimensioned to bias said first ends of said strips toward said second ends of said strips, said elastic strip being selectively extensible when said first and second ends of said flexible lead member are moved axially away from each other wherein said first and second sound producing strips contact each other and emit a snapping sound.

2. The dog training lead as set forth in claim 1, wherein said elongated flexible lead member and said first and second sound producing strips are defined as a one-piece construction.

3. The dog training lead as set forth in claim 1, wherein said elongated flexible lead member is inelastic.

4. The dog training lead as set forth in claim 1, wherein said elastic strip member comprises one of a woven fabric member including elastic elements and a non-woven fabric member including elastic elements.

5. The dog training lead as set forth in claim 1, wherein said second ends of said sound producing strips define therebetween an axially extending pocket in which a portion of said second end of said elastic member is positioned.

6. The dog training lead as set forth in claim 5, wherein said pocket is a twin-needle pocket.

7. The dog training lead as set forth in claim 1, further comprising:
    a handle located at said first end of said elongated flexible lead member; and,
    a clasp located at said second end of said elongated flexible lead member.

8. A dog training device comprising:
    an elongated flexible lead; and,
    means for producing a corrective sound when a corrective pull is exerted on said lead, said means for producing a corrective sound comprising first and second portions of said flexible lead that emit said corrective sound when forcibly contacted together and means for biasing said first and second portions of said flexible lead into a normally spaced-apart condition.

9. The dog training device as set forth in claim 8, wherein said first and second portions of said flexible lead are defined as a one-piece construction with each other.

10. The dog training device as set forth in claim 9, wherein said first and second portions of said flexible lead have identical length.

11. A method of manufacturing a dog training lead comprising:
    folding a first portion of an elongated fabric member upon a second portion of said elongated fabric member;
    selectively stitching said first and second portions of said elongated fabric member together so that first and second opposed facing strips are defined respectively by said first and second portions of said fabric member, said first and second strips separated by a space and selectively movable from a spaced-apart position forcibly toward and into contact with each other in response to axial movement of opposite ends of each of said first and second strips away from each other;
    connecting a resilient member to said elongated fabric member in said space defined between said first and second strips, said resilient member conformed and dimensioned so that said resilient member: (i) biases opposite axial ends of each of said first and second strips normally toward each other; and, (ii) selectively extends in response to axial movement of said opposite axial ends of each of said first and second strips away from each other; and,
    securing a clasp to a distal end of said elongated fabric member.

12. The method as recited in claim 11, wherein said step of selectively stitching said first and second portions of said elongated fabric member together comprises defining a twin-needle pocket that opens into said space between said first and second strips, wherein a portion of said resilient member is located in said twin-needle pocket.

13. A dog training lead manufactured in accordance with the method of claim 11.

14. A dog training method comprising:

connecting an associated dog to a training lead that comprises a distal end adjacent the associated dog, a proximal end and first and second strip portions intermediate said distal end and said proximal end;

grasping said proximal end of said dog training lead;

exerting a corrective pull on said proximal end of said dog training lead in a direction away from said distal end of said training lead so that said first and second strip portions contact each other forcibly and emit a snapping sound.

* * * * *